United States Patent
Hultell et al.

(10) Patent No.: US 10,075,923 B2
(45) Date of Patent: *Sep. 11, 2018

(54) NETWORK NODE AND METHOD FOR DETERMINING DOWNLINK TRANSMISSION POWER FOR A DOWNLINK SHARED CHANNEL

(71) Applicant: TELEFONAKTIEBOLAGET LM ERICSSON (PUBL), Stockholm (SE)

(72) Inventors: Johan Hultell, Solna (SE); Lars Mårtensson, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1 day.

This patent is subject to a terminal disclaimer.

(21) Appl. No.: 15/039,155

(22) PCT Filed: Nov. 28, 2013

(86) PCT No.: PCT/SE2013/051406
§ 371 (c)(1),
(2) Date: May 25, 2016

(87) PCT Pub. No.: WO2015/080636
PCT Pub. Date: Jun. 4, 2015

(65) Prior Publication Data
US 2017/0164295 A1    Jun. 8, 2017

(51) Int. Cl.
*H04B 1/00* (2006.01)
*H04B 7/00* (2006.01)
(Continued)

(52) U.S. Cl.
CPC ......... *H04W 52/143* (2013.01); *H04W 52/16* (2013.01); *H04W 52/24* (2013.01);
(Continued)

(58) Field of Classification Search
CPC ............. H04W 52/0026; H04W 52/42; H04W 52/143; H04W 52/16; H04W 52/225;
(Continued)

(56) References Cited

U.S. PATENT DOCUMENTS 7,197,021 B2    3/2007    Seo et al.
2003/0039217 A1*    2/2003    Seo ..................... H04W 52/16
                                                          370/318
(Continued)

FOREIGN PATENT DOCUMENTS

| EP | 1513272 A1 | 3/2005 |
| EP | 2086268 A2 | 8/2009 |
| WO | 0230009 A1 | 4/2002 |

*Primary Examiner* — Yuwen Pan
*Assistant Examiner* — Paul P Tran

(57) ABSTRACT

A network node and a method performed by a network node for determining downlink transmission power for a downlink shared channel to be used in a Transmission Time Interval, TTI, by cells served by the network node in a wireless telecommunications network. The network node determines the downlink transmission power available to a cell for physical channels associated with the downlink shared channel based on downlink transmission power allocated in the cell to physical channels associated with a pilot signal downlink channel.

15 Claims, 5 Drawing Sheets

(51) Int. Cl.
*H04W 36/00* (2009.01)
*H04B 1/38* (2015.01)
*H04W 4/00* (2018.01)
*H04B 7/216* (2006.01)
*H04W 52/14* (2009.01)
*H04W 52/16* (2009.01)
*H04W 52/32* (2009.01)
*H04W 52/28* (2009.01)
*H04W 52/24* (2009.01)
*H04W 52/58* (2009.01)

(52) U.S. Cl.
CPC ....... *H04W 52/286* (2013.01); *H04W 52/325* (2013.01); *H04W 52/58* (2013.01)

(58) Field of Classification Search
CPC . H04W 52/226; H04W 52/245; H04W 52/24; H04W 52/262; H04W 52/264; H04W 52/281; H04W 52/286; H04W 52/32; H04W 52/322; H04W 52/325; H04W 52/327; H04W 52/58; H04W 72/1289; H04W 52/08; H04W 52/221; H04W 52/241; H04W 52/242; H04W 52/244; H04W 52/26; H04W 52/30; H04W 52/40; H04W 52/50; H04W 28/10; H04W 28/18; H04W 28/22; H04W 72/042; H04W 72/0406; H04W 72/0473; H04W 74/004; H04W 74/006; H04W 74/08; H04W 74/0833; H04W 76/28
USPC ....... 455/69, 115.3, 442, 522, 561; 370/328, 370/329, 331, 335, 352, 468
See application file for complete search history.

(56) References Cited

U.S. PATENT DOCUMENTS

| | | | | |
|---|---|---|---|---|
| 2006/0252446 | A1* | 11/2006 | Zhang | H04W 52/143 455/522 |
| 2009/0069017 | A1* | 3/2009 | Usuda | H04B 1/7103 455/522 |
| 2009/0196246 | A1* | 8/2009 | Goto | H04W 52/286 370/329 |
| 2010/0002596 | A1* | 1/2010 | Wu | H04W 52/143 370/252 |
| 2010/0008312 | A1* | 1/2010 | Viswanath | H04W 72/042 370/329 |
| 2010/0238905 | A1* | 9/2010 | Hamabe | H04W 52/242 370/335 |

* cited by examiner

NETWORK NODE AND METHOD FOR DETERMINING DOWNLINK TRANSMISSION POWER FOR A DOWNLINK SHARED CHANNEL

This application is a 371 of International Application No. PCT/SE2013/051406, filed Nov. 28, 2013, the disclosure of which is fully incorporated herein by reference.

TECHNICAL FIELD

Embodiments herein relate to the transmission powers of downlink shared channel in a wireless telecommunications network. In particular, embodiments herein relate to a network node and a method for determining downlink transmission power for a downlink shared channel in a wireless telecommunications network.

BACKGROUND

In a typical cellular network, also referred to as a wireless communication system, User equipment, UEs, communicate via a Radio Access Network, RAN, to one or more core networks, CNs.

A user equipment is a mobile terminal by which a subscriber may access services offered by an operator's core network and services outside operator's network to which the operator's RAN and CN provide access. The user equipment may be for example communication devices such as mobile telephones, cellular telephones, smart phones, tablet computers or laptops with wireless capability. The user equipment may be portable, pocket-storable, hand-held, computer-comprised, or vehicle-mounted mobile devices, enabled to communicate voice and/or data, via the radio access network, with another entity, such as another mobile station or a server. User equipments are enabled to communicate wirelessly in the cellular network. The communication may be performed e.g. between two user equipments, between a user equipment and a regular telephone and/or between the user equipment and a server via the RAN and possibly one or more CNs, comprised within the cellular network.

The RAN covers a geographical area which is divided into cell areas, with each cell area being served by a base station, e.g. a Radio Base Station (RBS), which in some RANs is also called eNodeB (eNB), NodeB, B node or network node. A cell area is a geographical area where radio coverage is provided by the radio base station at a base station site. Each cell area is identified by an identity within the local radio area, which is broadcast in the cell area. The base stations communicate over the air interface operating on radio frequencies with the user equipment within range of the base stations. It should be noted that a base station may serve one or more cells, also referred to as cell carriers, within its cell area.

According to one example, a RAN may be based on a Wideband Code Division Multiple Access/High Speed Packet Access, WCDMA/HSPA, technology. In such a RAN, there are different ways to send data in downlink transmissions to a user equipment when the user equipments is operating in an active state, e.g. a CELL_DCH state. Note that this active state is the opposite to an idle state, e.g. a CELL_FACH state. In the idle state, the user equipment only communicate using common channels, while in the active state, the user equipment may communicate using both common and dedicated channels.

In the active state, a Dedicated Physical CHannel, DPCH, also sometimes referred to as a DCH channel, or a High-Speed Downlink Shared CHannel, HS-DSCH, may be used in addition to the common channels. Using the HS-DSCH channel is usually referred to as HSDPA operation, and unlike the DPCH, the HS-DSCH channel is shared amongst multiple user equipments. The HS-DSCH channels may thus be referred to as a shared channel as oppose to a dedicated channel, such as, DPCH.

In practice, the DPCH and HS-DSCH channels may co-exist, i.e. be used simultaneously by the network node, for downlink transmissions. This means that at a given time instant, a network node may transmit both DPCH and HS-DSCH transmissions to user equipments within the same cell.

However, this also means that the available resources of the network node, such as, channelization codes, downlink transmission, DL TX, power, etc., needs to be shared between the DPCH and HS-DSCH transmissions. Also, since the resources of the network node that are allocated to the HS-DSCH transmissions are shared, they are therefore used as a common resource. This means that for each Transmission Time Interval, TTI, the common resource may be dynamically shared between the user equipments in the same cell. This enables a large part, e.g. some or all, of the common resources of the network node to be allocated to one or more specific user equipments in a given TTI. On the contrary, the resources of the network node that are allocated to the DPCH transmissions are used as a dedicated resource.

For the HS-DSCH downlink transmissions, the possibility to dynamically share and allocate the resources of the network node as a common resource in a cell is particularly beneficial for packet data. This is because packet data generally have bursty characteristics resulting in a highly varying resource need for the user equipments in the cell, and because dynamically deciding to which user equipment in the cell the resources of the network node is to be allocated allows for more resources to be given to those user equipments in the cell having data in their data priority queues at the network node that needs to be transmitted. This will thus increase the overall efficiency of the downlink data transmissions in the cell.

This also means that the more resources of the network node, i.e. channelization codes, DL TX power, etc., that are available for transmissions in the cell, the more payload data, i.e. information bits, may be sent on the HS-DSCH channel in the cell. While the number of channelization codes available for HS-PDSCH downlink transmissions are limited to 15 SF16 HS-PDSCH codes, the available DL TX power is only dependent of the capabilities of the power amplifier that is used for physically transmitting the data in the cell.

In a cell, the total DL TX power, i.e. the total cell power, needs to be shared between all physical channels. This comprises the physical channels associated with the DPCH channels, such as, e.g. F-DPCH, DPDCH and DPCCH. It also comprises the physical channels associated with the HS-DSCH channels, such as, e.g. HS-PDSCH, HS-SCCH. In order to maximize the HSDPA performance, i.e. the use of the physical channels associated with the HS-DSCH channels, while at the same time maintaining the quality of the dedicated channels, i.e. the quality of the physical channels associated with the DPCH channels, a common approach is to allow HS-DSCH transmissions in a cell to use the remaining DL TX power once DL TX power has been allocated for the common and dedicated channels in the cell.

One example of this common approach is illustrated in FIG. 1. Here, the common channels are allocated a constant amount of the total DL TX power, while the amount of the total DL TX power to the dedicated channels is power controlled. Thus, the remaining DL TX power available for the HS-DSCH channel will vary.

Given the amount of DL TX power in a cell and the number of channelization codes available for the HS-DSCH downlink transmission in a cell, the network node may determine, for each TTI, to which user equipment in the cell data shall be transmitted to on the downlink on the HS-DSCH channel, and how much data which should be transmitted in the TTI. The amount of data that may be sent, or the Transport Block Size, TBS, that is used, in a single TTI is commonly based on the available number of channelization codes in the cell and the DL TX power available to the HS-DSCH transmission in the cell.

For every TTI, or scheduling opportunity, the network node may determine how much DL TX power that may be used for the HS-DSCH transmission, i.e. $P_{HS}$, in the TTI for a cell based on the following formula (Eq. 1):

$$P_{HS} = P_{total\ cell\ power} - P_{dedicated\ channels} - P_{common\ channels} \quad \text{(Eq. 1)}$$

Here, the $P_{total\ cell\ power}$ is the total DL TX power that is allocated to the cell, the $P_{dedicated}$ channels is the DL TX power that is allocated to the dedicated channels in the cell, and the $P_{common\ channels}$ is the DL TX power that is allocated to the common channels in the cell. The common channels may comprise e.g. CPICH, E-AGCH, E-HICH, HS-SCCH, etc. Once the available $P_{HS}$ and the available number of channelization codes are known for the cell, it is straightforward for the network node to determine how much data that may be sent in the TTI for the cell based on a specific Quality of Service, QoS. The specific QoS may be measured in terms of e.g. a target BLock Error Rate, BLER.

However, this means that, for example, when there is not enough data in the user equipment's priority queues at the network node for the cell, e.g. when data may be transmitted with the desired QoS-level utilizing less power than $P_{HS}$, the result may be that not all of the available $P_{HS}$ will be used for HS-DSCH downlink transmission in the cell for the TTI.

For these cases, it may be possible in a network node having one or more radio units comprising one or more power amplifiers to dynamically share the DL TX power that may be used for the HS-DSCH transmission, i.e. $P_{HS}$, in a TTI amongst cells that are sharing a power amplifier in a radio unit of the network node. This dynamical sharing of HSDPA power may occur e.g. when one or more cells would benefit from additional HSDPA power, i.e. having enough data to transmit in their RBS buffers, at the same time as one or more of the other cells does not use all their HSDPA power, as exemplified above. This dynamical sharing of HSDPA power amongst cells sharing a power amplifier should be performed such that the HSDPA performance is improved.

SUMMARY

It is an object of embodiments herein to improve downlink channel transmissions in a wireless telecommunications network.

According to a first aspect of embodiments herein, the object is achieved by a method performed by a network node for determining downlink transmission power for a downlink shared channel to be used in a Transmission Time Interval, TTI, by cells served by the network node in a wireless telecommunications network. The network node determines the downlink transmission power available to a cell for physical channels associated with the downlink shared channel based on downlink transmission power allocated in the cell to physical channels associated with a pilot signal downlink channel.

According to a second aspect of embodiments herein, the object is achieved by a network node for determining downlink transmission power for a downlink shared channel to be used in a TTI by cells served by the network node in a wireless telecommunications network. The network node being configured to determine the downlink transmission power available to a cell for physical channels associated with the downlink shared channel based on downlink transmission power allocated in the cell to physical channels associated with a pilot signal downlink channel.

By having the DL TX power for downlink shared channel transmissions in a cell based on the DL TX power for pilot signal transmissions, the network node is able to ensure the performance of all downlink channel transmissions in the cell.

This is because a large difference in a cell between the total DL TX power of all downlink channel transmissions and the DL TX power of the pilot signal transmission may result in that poor channel estimations are derived from these pilot signals. Such poor channel estimations may in turn result in a failure to detect and/or demodulate one or more of the physical channels associated with the downlink shared channel or any other downlink channel for that matter. Hence, if too much DL TX power for downlink shared channel transmissions is shared with the cell from another cell, the result may be such a large difference between the total DL TX power of all downlink channel transmissions and the DL TX power of the pilot signal transmissions.

Thus, by enabling a limit to be set on the DL TX power that may be used for the downlink shared channel transmissions in a cell based on the DL TX power for pilot signal transmissions, the network node will increase the performance of the downlink channel transmission in the cell. This will improve the downlink channel transmissions in the wireless telecommunications network.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
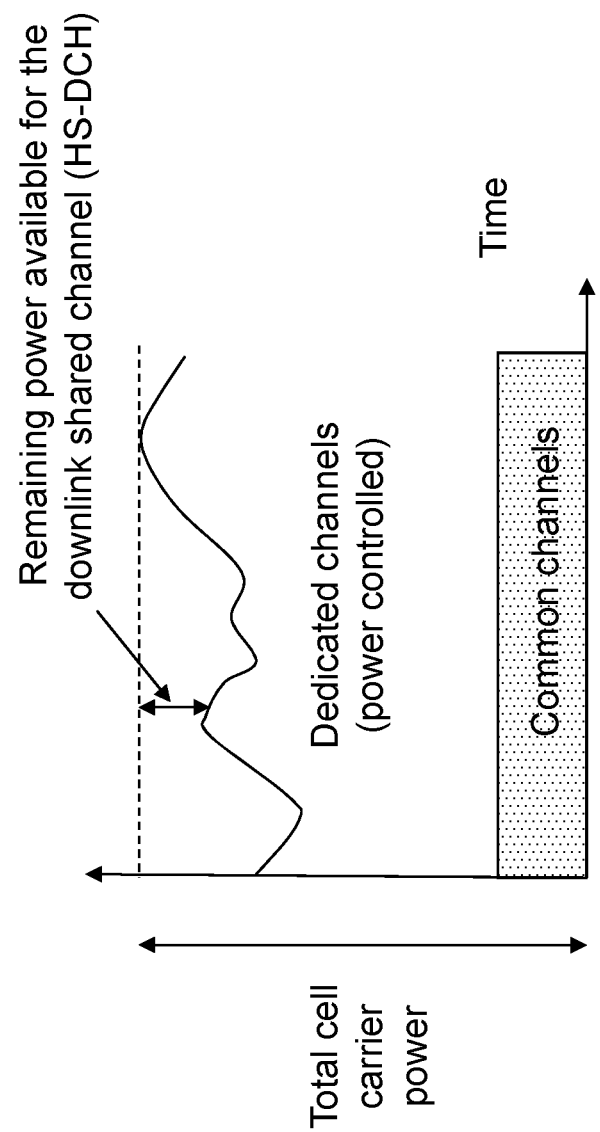
FIG. 1 is a schematic diagram illustrating HSDPA power allocation of the total DL TX power in a cell.

The figures are schematic and simplified for clarity, and they merely show details which are essential to the understanding of the embodiments presented herein, while other details have been left out. Throughout, the same reference numerals are used for identical or corresponding parts or steps.

Figure 2:
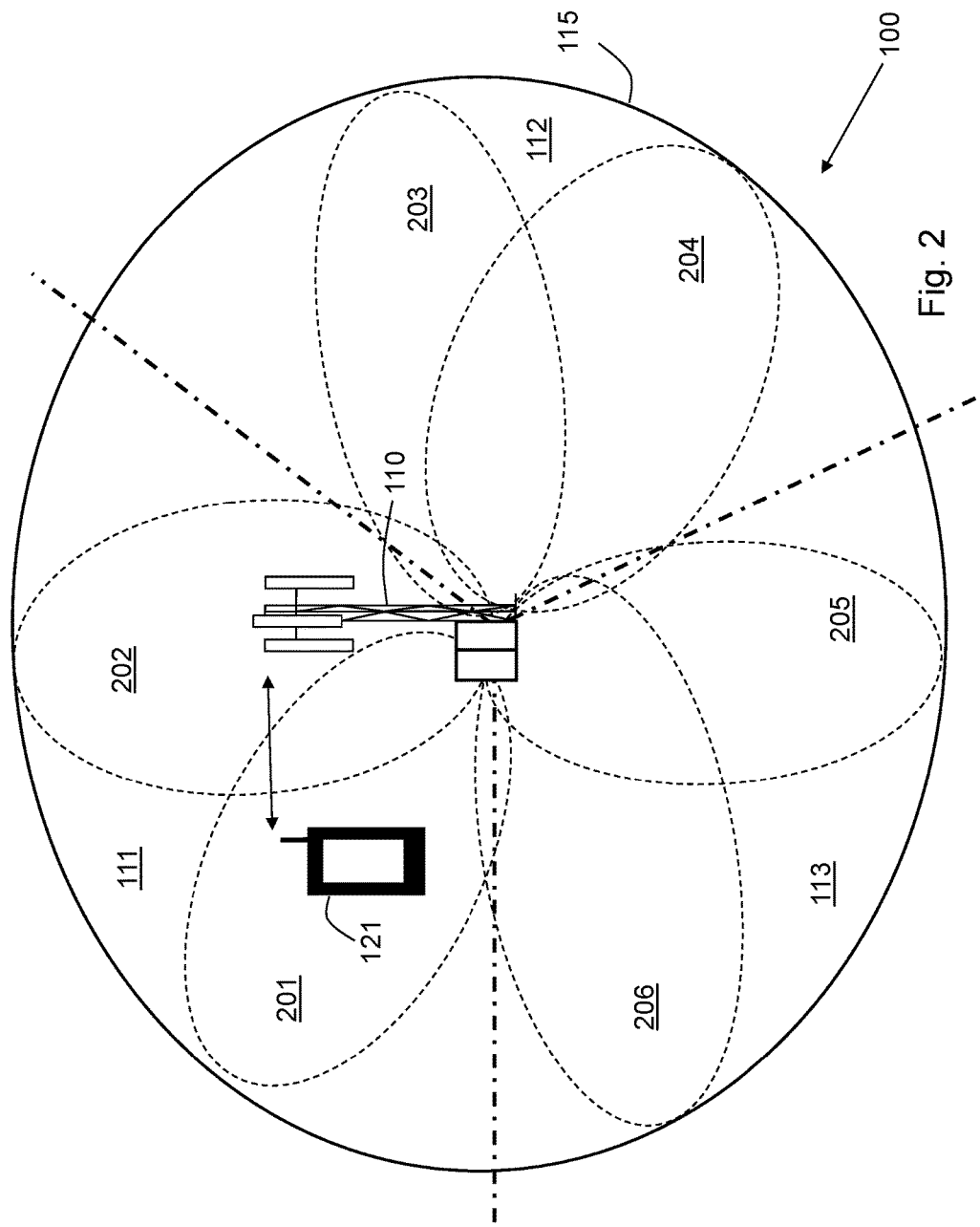
FIG. 2 is a schematic block diagram illustrating embodiments of a network node in a wireless communications network.

FIG. 2 shows a schematic block diagram illustrating embodiments of a network node 110 in a wireless communications network 100.

The network node 110 may comprise several power amplifiers and antennas providing radio coverage to user equipments 121 in the cell area 115. In this example, the cells 201, 202 which provide radio coverage in the same sector 111 of the cell area 115 may share a radio unit in the network node 110, and thus may also share the power amplifier(s) of said radio unit. The same applies, in this example, to the cells 203, 204 which provide radio coverage in the same sector 112, and to the cells 205, 206 which provide radio coverage in the same sector 113.

It should be noted that some of the cells may transmit on the same cell carrier but in different sectors and thus in this case be referred to as one single cell. An example illustrating this principle is, for example, to have the cells 201, 203 and 205 transmit on the same cell carrier but in different sectors 111, 112, and 113, respectively, and may thus in this case be referred to as a one single cell. Here, the cells 202, 204 and 206 transmit on the same cell carrier but in different sectors 111, 112, and 113, respectively, and thus in this case also may be referred to as a one single cell.

It should also be noted that in a wireless telecommunications network 100 as described above, it is important that the sum of the DL TX power used by all cells that are sharing a power amplifier in the network node 100, e.g. cells 201 and 202, cells 203 and 204, cells 205 and 206, respectively, do not exceed the capabilities of the power amplifier(s) of their radio unit in the network node 110.

As part of understanding and developing the embodiments described herein, some problems are first identified and discussed in more detail.

For the purpose of illustration, the wireless communications network 100 in the example below is based on WCDMA/HSPA, however, this should not be considered as limiting since similar examples may exist when the wireless communications network 100 is based on other RATs, such as, e.g. LTE.

Data of downlink shared channel transmissions, e.g. HS-DSCH payload information, is carried over the physical channel HS-PDSCH, e.g. from the network node 110 to the user equipment 121 in cell 201. However, to successfully decode and demodulate the physical channel HS-PDSCH, the user equipment 121 is first required to decode and demodulate the physical channel HS-SCCH. The physical channel HS-SCCH is used by the network node 110 to carry information related to e.g. the modulation and coding of the data carried on the PDSCH, Transport Block Size (TBS) of the PDSCH, etc.

Moreover, in order to decode and demodulate HS-SCCH, or any physical channel for that matter, the user equipments 121 need to estimate the radio channel or connection between the network node 110 and the user equipments. This channel estimation, or channel estimates, is derived from the pilot signals transmitted by the network node 110. One example of such a pilot signal is P-CPICH, and in case of MIMO transmissions, also S-CPICH. The quality of this channel estimation, or channel estimates, thus depends on the quality of the pilot signal transmission, e.g. Signal-to-Interference Ratio, SIR, of the pilot signal(s) P/S-CPICH. Hence, if the CPICH SIR is low, then the quality of the channel estimation, or channel estimates, will be inferior or poor.

Having poor quality channel estimates may result in that, e.g. the user equipment 121 is not able to detect and/or demodulate the physical channel HS-SCCH successfully. This will in turn result in that the HS-DSCH payload information transmitted on the physical channel HS-PDSCH is not decoded. Alternatively, the user equipment 121 is able to detect and demodulate the physical channel HS-SCCH, but fails in successfully demodulating the physical channel HS-PDSCH. This will cause retransmissions and decrease the performance of the HS-DSCH transmissions in the cell 201.

Additionally, the quality of the pilot signal transmission, e.g. CPICH SIR, may also be used by the network node 110 for several other purposes.

According to one example, when the radio signal strength or radio coverage of the connection between the network node 110 and the user equipment 121 becomes so low that an adequate Quality-of-Service, QoS, is not able to be ensured by the network node 110 for the cell 201, this may be determined by the network node 110 and the user equipment 121 by using the quality of the pilot signal transmission, e.g. CPICH Ec/No SIR. Here, the CPICH Ec/No is a measurement that takes both the path loss and the interference situation into consideration, and may commonly be defined as the energy per chip divided by the total in-band interference.

For example, the network node 110 may configure the user equipments 121 to report to the network node 110 when the CPICH Ec/No SIR-values become falls below a determined threshold value during a certain time period. This may commonly be referred to as Event 2D based on Ec/No. This event may thus be a trigger for the network node 110 to initialize IFHO or IRAT handover procedures. Both of these handover procedures require a compressed mode, which is known to reduce the HSDPA performance, e.g. the performance of the HS-DSCH transmissions in the cell 201, since it introduces measurement gaps.

From the above, it has been realized that since radio transmissions in a cell are non-orthogonal due to, e.g. the delay spread of the radio channel and receiver imperfections, a too large difference between the total DL TX power in a cell, $P_{cell,max}$, and the DL TX power for pilot signal transmissions in the cell, $P_{CPICH}$, may not result in an improvement of the HSDPA performance, e.g. the performance of the HS-DSCH transmissions in the cell 201, when dynamically sharing DL TX power for downlink shared channel transmissions between cells that are sharing the same power amplifier; and this, simply because the SIR of the pilot signals, e.g. CPICH, then becomes poor or inferior.

In the following, according to embodiments herein which relate to determining downlink transmission, DL TX, power for a downlink shared channel in a wireless telecommunications network, there will be disclosed network node 110 which ensures that the total DL TX power in a cell does not become too large, e.g. when dynamic DL TX power sharing between cells sharing the same power amplifier is applied.

As indicated above, this is because using too much DL TX power in a cell, or equivalently having a too low relative setting of the CPICH power may result in undesired behaviour. Examples of this undesired behaviour may be an increase in IF and IRAT handovers or inferior user performance since channel estimates derived from the CPICH become of too poor quality to demodulate the HS-SCCH and/or HS-PDSCH.

Figure 3:
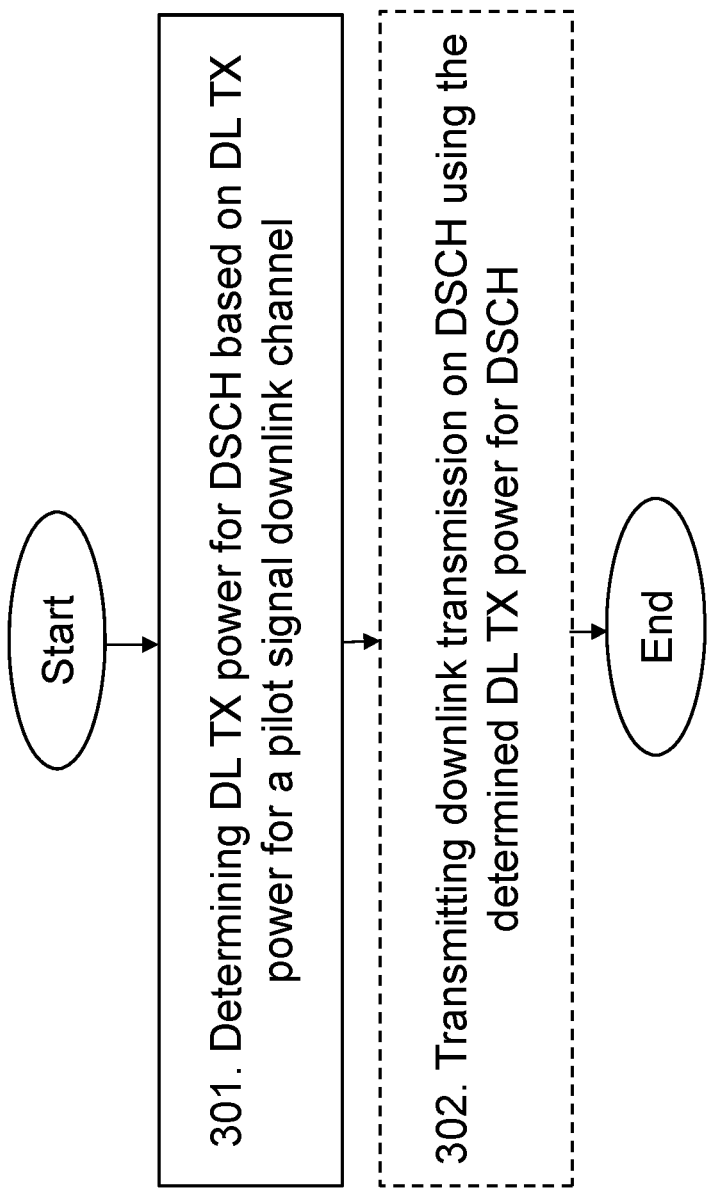
FIG. 3 is a flowchart depicting embodiments of a method in a network node.

Example of embodiments of a method performed by a network node 110 for determining downlink transmission, DL TX, power for a downlink shared channel, DSCH, to be used in a Transmission Time Interval, TTI, by cells 201, 202, 203, 204, 205, 206 served by the network node 110 in a wireless telecommunications network 100, will now be described with reference to the flowchart depicted in FIG. 3. FIG. 3 is an illustrated example of actions or operations which may be taken by a network node 110. The method may comprise the following actions.

Action 301

In this action, the network node 110 determine the DL TX power available to a cell, e.g. cell 201, for physical channels associated with the downlink shared channel based on DL TX power allocated in the cell, e.g. cell 201, to physical channels associated with a pilot signal downlink channel. This advantageously enables the network node 110 to limit the DL TX power that may be used for the downlink shared channel transmissions in the cell 201 by ensuring that the total DL TX power for all downlink channel transmissions in the cell 201 does not become too large in relation to the DL TX power for pilot signal transmissions in the cell 201.

It should here be noted that, when dynamic DL TX power sharing between cells sharing the same power amplifier is applied, this advantageously limits the additional DL TX power for the downlink shared channel transmissions in the cell 201 that may be shared to the cell 201 by other cells, e.g. cell 202, sharing the same power amplifier as the cell 201.

In some embodiments, the pilot signal downlink channel is the Common Pilot Channel, CPICH.

In some embodiments, the network node 110 may determine the DL TX power available to the cell 201 for physical channels associated with the downlink shared channel further based on an instantaneous value of the total DL TX power allocated to the cell 201 for physical channels associated with downlink channels for a TTI. According to one example, the maximum amount of additional DL TX power that may be shared to a cell 201 by other cells, e.g. cell 202, in a given TTI may be determined by a condition that stipulates the minimum instantaneous ratio between the total DL TX power of the cell 201, denoted herein $P_{total,instantaneous}$, and the DL TX power of the pilot signal downlink channel, denoted herein $P_{CPICH}$. This condition may be described as in Eq. 2, wherein $x_1$ is a determined minimum instantaneous ratio.

$$P_{total,instantaneous}/P_{CPICH} \leq x_1 \qquad (Eq. 2)$$

$P_{total,instantaneous}$ is the total DL TX power available to the cell 201, which is used by a HS scheduler in the network node 110 when determining the available DL TX power for physical channels associated with the downlink shared channel in the cell 201. In other words, $P_{total,instantaneous}$ may be the instantaneous DL TX power used by the cell 201 for physical channels associated with all downlink channels in the TTI.

Thus, the network node 110 may determine the DL TX power available to the cell 201 for physical channels associated with the downlink shared channel further based on a determined minimum ratio between the instantaneous value and the DL TX power allocated in the cell, e.g. 201, to physical channels associated with the pilot signal downlink channel. These embodiments ensure that the pilot signal downlink channel quality is continuously good, i.e. at a suitable level.

Alternatively, the network node 110 may determine the DL TX power available to the cell 201 for physical channels associated with the downlink shared channel further based on an average value of the total DL TX power allocated to the cell 201 for physical channels associated with downlink channels for more than one TTI. According to one example, the maximum amount of additional DL TX power that may be shared to a cell 201 by other cells, e.g. cell 202, may be determined by a condition that stipulates the minimum average ratio between the total DL TX power of the cell 201, denoted herein $P_{total,average}$, and the DL TX power of the pilot signal downlink channel, denoted herein $P_{CPICH}$. This condition may be described as in Eq. 3, wherein $x_2$ is a determined minimum average ratio.

$$P_{total,average}/P_{CPICH} \leq x_2 \qquad (Eq. 3)$$

In this case, the maximum DL TX power of the cell 201, $P_{total,average}$, may be a weighted average of the instantaneous DL TX powers used by the cell 201. Two examples of such weighted averages are given by Eq. 4-5.

$$P_{total,average}(t+1) = \frac{1}{m}\sum_{i=t-m}^{t} P_{total,instantaneous}(i) \qquad (Eq. 4)$$

and $$P_{total,average}(t) = (1-\alpha)P_{total,average}(t-1) + \alpha P_{total,instantaneous}(t) \qquad Eq. 5)$$

Here, $P_{total,instantaneous}$ is the instantaneous DL TX power used by the cell 201 for physical channels associated with all downlink channels in the TTI t.

Thus, the network node 110 may determine the DL TX power available to the cell 201 for physical channels associated with the downlink on shared channel further based on a determined minimum ratio between the average value and the DL TX power allocated in the cell, e.g. 201, to physical channels associated with the pilot signal downlink channel. These embodiments ensure that the average DL TX transmit power of the cell, e.g. cell 201, is not too high. Thus, in these embodiments, the instantaneous DL TX power difference with respect to CPICH, $P_{total,instantaneous}/P_{CPICH}$, is not strictly limited.

It should be noted that the conditions put on the instantaneous or average cell DL TX power for physical channels associated with all downlink channels as described in embodiments above, may be used by the network node 110 to derive the maximum total HSDPA power that may be used by the cell for physical channels associated with the downlink shared channel in the given TTI. The maximum total HSDPA power here meaning the sum of the DL TX power for the downlink shared channel transmissions in the cell 201 and the additional DL TX power for the downlink shared channel transmissions in the cell 201 shared by other cells, e.g. cell 202, sharing the same power amplifier as the cell 201.

In some embodiments, the determined minimum ratio, e.g. instantaneous or average ratios, may be determined using a downlink transmission quality or type information. This means that the network node 110 may dynamically adjust the determined minimum ratios, e.g. $x_1$ and $x_2$, based on feedback information, e.g. how frequently compressed mode is triggered in the network node 110.

According to one example of using a DL TX quality, the network node 110 may use an Acknowledgement/Non-Acknowledgement, ACK/NACK, misdetection ratio. The ACK/NACK misdetection ratio may be defined as the event that the network node 110 does not detect the ACK/NACK even though the network node 110 has scheduled data on the DL and thus is expecting an ACK/NACK transmission in return. A high or increased value of the ACK/NACK misdetections is an indication that a user equipment is unable to detect the physical channel HS-SCCH, which in turn could be a consequence of intra-cell interference. Therefore, the network node 110 may use a high or increased ACK/NACK misdetection ratio as an indication to reduce the determined minimum ratios, e.g. $x_1$ and $x_2$. Similarly, the network node 110 may use a low ACK/NACK misdetection ratio as an indication to increase the determined minimum ratios, e.g. $x_1$ and $x_2$.

According to another example using a DL TX type information, the network node 110 may use a ratio of IRAT and/or IF handover procedures. For example, if the Ec/No SIR becomes too low and Ec/No is used as a trigger to start compressed mode, there will be an increased amount of IRAT and IF handover procedures. Hence, the network node 110 may use an increased ratio of IRAT/IF handovers as an indication, or trigger, to reduce the determined minimum ratios, e.g. $x_1$ and $x_2$. Similarly, the network node 110 may use a low or moderate ratio of IF/IRAT handovers as an indication, or trigger, to possibly increase the determined minimum ratios, e.g. $x_1$ and $x_2$.

The embodiments above are illustrative examples. However, the maximum amount of additional HSDPA power, i.e. additional DL TX power available for physical channels associated with the downlink shared channel, that may be allocated to a cell, e.g. cell 201, by the network node 110 may dynamically be determined by a function taking on or more of the following parameters into consideration: the available HSDPA power, e.g. the instantaneous or average values described above, the DL TX power of the pilot signal downlink channel, e.g. CPICH power, and the transmission number, i.e. is the transmission an initial transmission or a re-transmission.

In some embodiments, the network node 110 may determine the DL TX power available to the cell 201 for physical channels associated with the downlink on shared channel further based on whether a downlink transmission in the TTI is an initial transmission or a re-transmission. In this case, the determined DL TX power available to the cell, e.g. cell 201, for a downlink re-transmission in a TTI may be less than the determined DL TX power available to the cell, e.g. cell 201, for a downlink initial transmission in a TTI. By taking the transmission number into account as described above, the network node 110 may e.g. determine that TTIs which are carrying retransmissions gets a lower, or potentially none, additional HSDPA power in the given TTI when dynamic DL TX power sharing between cells sharing the same power amplifier is applied. One reason for this approach is that in the case of retransmission, the network node 110 may benefit from soft combining with the initial transmissions, and that the additional benefit of additional HSDPA power, thus is smaller than compared to the initial transmission case.

One example of a function that may be used by the network node 110 which fulfils the requirements above is that the maximum additional HSDPA power that may be allocated to the cell i, that is, $P_{additional,i}$ is given by Eq. 6-7:

$P_{additional,i}=\min(\lambda P_{HS,i},\min(\beta P_{CPICH},P_{shared}))$ if initial transmission on cell i (Eq. 6)

$P_{additional,i}=0$ if retransmission on cell i (Eq. 7)

where $\beta$ and $\lambda$ are constants. $P_{HS,i}$ here denotes the available HSDPA power of cell i in case there is not any additional HSDPA power allocated to the cell i, and $P_{shared}$ denotes the maximum level of additional HSDPA power that could be allocated to cell i in TTI t.

From the above, it may be noticed that the more the DL TX power that is allocated to the cell, e.g. cell 201, for the pilot signal downlink channel, the more additional HSDPA power may be allocated to the cell, e.g. the larger the CPICH power values are, the larger the instantaneous DL TX power in a TTI may be.

In some embodiments, the network node 110 may determine the DL TX power available to the cell 201 for physical channels associated with the downlink shared channel as relative to, or proportional to, the DL TX power allocated in the cell, e.g. cell 201, to physical channels associated with a pilot signal downlink channel.

This means that the additional DL TX power for the downlink shared channel transmissions in the cell 201 that may be shared to the cell 201 by other cells, e.g. cell 202, sharing the same power amplifier as the cell 201 may relate, or be proportional to, the DL TX power allocated in the cell, e.g. cell 201, to physical channels associated with a pilot signal downlink channel, $P_{CPICH}$.

According to one example, the maximum amount of additional DL TX power that may be shared to a cell 201 by other cells, e.g. cell 202, may be determined by a condition that stipulates the ratio between the additional DL TX power of the cell 201, denoted herein $P_{HS\_additional}$, and the DL TX power of the pilot signal downlink channel, $P_{CPICH}$. This condition may be described as in Eq. 8, wherein $x_3$ is a determined ratio.

$P_{HS\_addition}/P_{CPICH}=x_3$ (Eq. 8)

This direct relation or proportionality is advantageous in that it ensures that the additional DL TX power for physical channels associated with the downlink shared channel that may be shared with a cell is increased with an increased DL TX power of the pilot signal downlink channel, $P_{CPICH}$. This may be a desired feature when the network node 110 is implemented in the wireless communications network 100.

Another advantage of this direct relation or proportionality is that operators of network nodes often adjust the settings for the CPICH automatically and continuously based on numerical optimization in their operator network, which may be troublesome to do if additional DL TX power for physical channels associated with the downlink shared channel is sometimes allowed and sometimes not allowed, e.g. it may be difficult to find a set point for a tuning algorithm. This direct relation or proportionality may ensure that additional DL TX power for physical channels associated with the downlink shared channel is always allowed, at least to some degree depending on the CPICH.

Action 302

After determining the DL TX power available to a cell for physical channels associated with the downlink shared channel, the network node 110 may transmit downlink transmissions using the determined DL TX power available to the cell, e.g. cell 201, for physical channels associated with the downlink shared channel.

Figure 4:
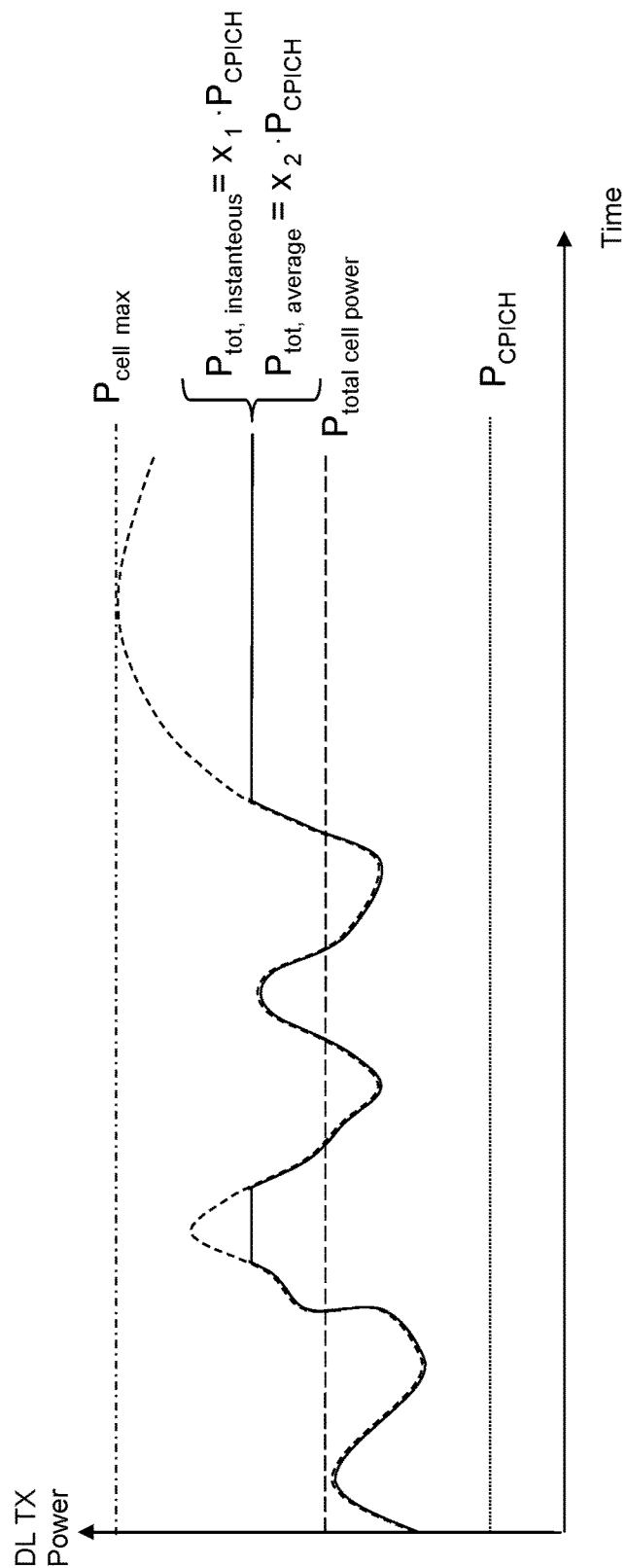
FIG. 4 is a schematic diagram illustrating DL TX power allocation in a cell according to some embodiments.

FIG. 4 shows a schematic diagram illustrating DL TX power allocation in a cell according to some embodiments.

This schematic diagram illustrates how the requirements of the embodiments described with reference to FIG. 3, e.g. the determined minimum ratios, may affect the DL TX power allocation in a cell, i.e. having the maximum HSDPA power that may be used in the cell being limited.

In FIG. 4, the P total cell power denote the maximum allocated DL TX power in the cell for physical channels associated with all downlink channels before any dynamic HSDPA DL TX power sharing. This is shown in FIG. 4 by the dashed line. $P_{CPICH}$ denote the DL TX power allocated in the cell to physical channels associated with a pilot signal downlink channel, e.g. CPICH. This is shown in FIG. 4 by the dotted line.

Here, $P_{cell\ max}$ denote the maximum allocated DL TX power in the cell for physical channels associated with all downlink channels given that dynamic HSDPA DL TX power sharing between cells sharing the same power amplifier is applied, i.e. when unused HSDPA power available from other cells j is shared and allocated to cell i. This is shown in FIG. 4 by the dashed and dotted line.

The total DL TX power that is actually available in a cell for physical channels associated with all downlink channels is shown by the fully drawn line in FIG. 4.

FIG. 4 shows how the determined minimum ratios, e.g. $x_1$ and $x_2$ of the embodiments described with reference to FIG. 3, may limit the total DL TX power allocated in a cell for physical channels associated with all downlink channels, when dynamic HSDPA DL TX power sharing between cells sharing the same power amplifier is used, based on the DL TX power allocated in the cell to physical channels associated with a pilot signal downlink channel.

Thus, this effectively puts a limit on the maximum allowed HSDPA DL TX power that may be shared with the cell from other cells sharing the same power amplifier. Hence, the total HSDPA DL TX power in the cell for physical channels associated with downlink shared channels, i.e. the HSDPA DL TX power allocated in a cell for physical channels associated with the downlink shared channel plus any additional HSDPA DL TX power (which may be dynamically shared to the cell by other cells) for physical channels associated with the downlink shared channel, at a given TTI is limited.

Figure 5:
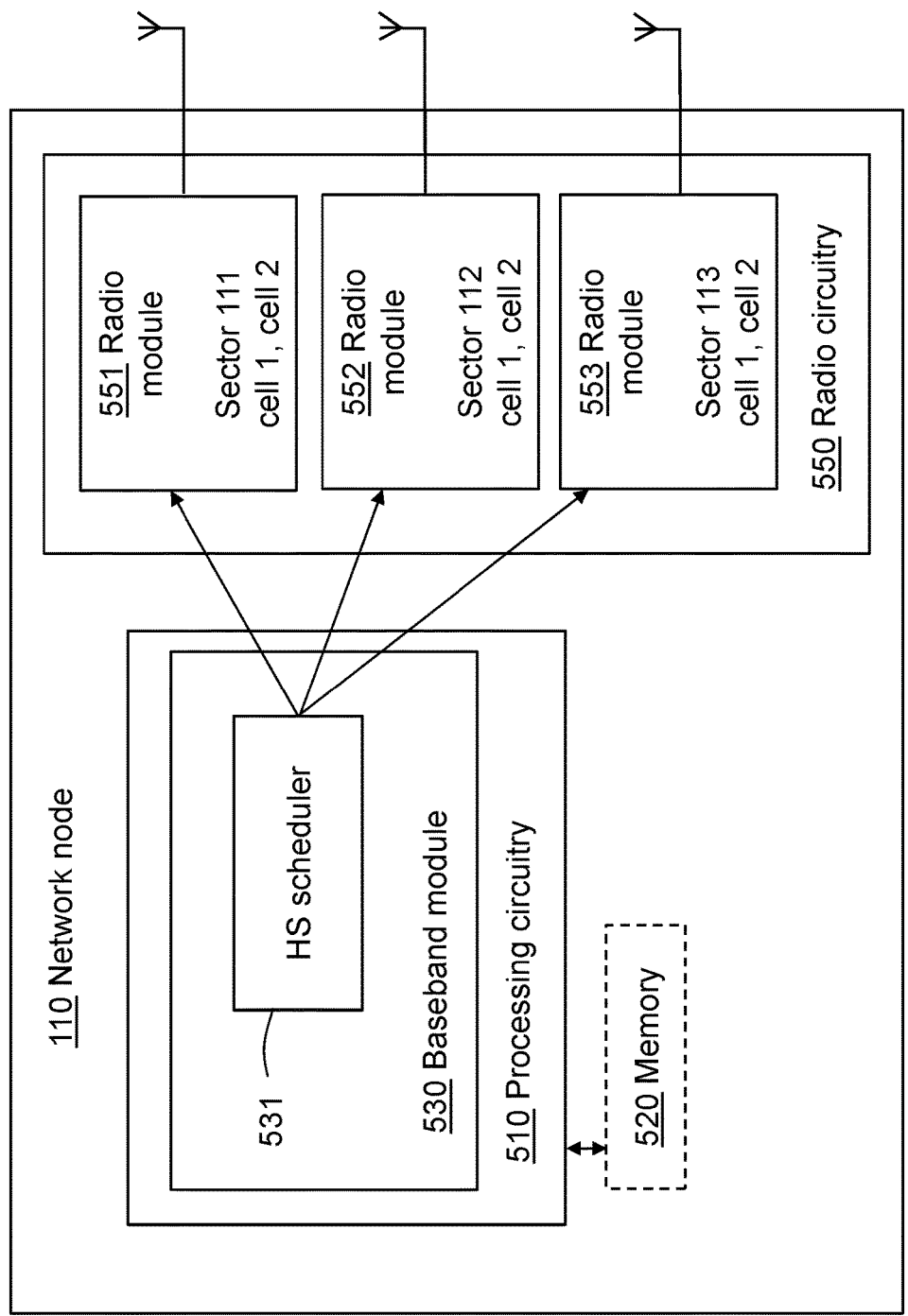
FIG. 5 is a block diagram depicting embodiments of a network node.

To perform the method actions in the network node 110 for determining amounts of DL TX power for a downlink shared channel to be used in a TTI by cells 201, 202, 203, 204, 205, 206 served by the network node 110 in a wireless telecommunications network 100, the network node 110 may comprise the following arrangement depicted in FIG. 5. FIG. 5 shows a schematic block diagram of embodiments of a network node 110.

The network node 110 comprises a one or more downlink shared channel scheduling module 531, which may also be referred to as scheduler, scheduling module, scheduling unit, HS-DSCH scheduler, or HS scheduler. The one or more downlink shared channel scheduling module 531 may be comprised in one or more baseband module 530, also referred to as baseband unit.

The downlink shared channel scheduling module 531 may be configured to dynamically share the DL TX power that may be used for the HS-DSCH transmission in a TTI amongst cells that are sharing a power amplifier in a radio unit of the network node. This dynamical sharing of HSDPA power may occur e.g. when one or more cells would benefit from additional HSDPA power, i.e. having enough data to transmit in their data transmission buffers, at the same time as one or more of the other cells does not use all their allocated HSDPA power.

The one or more downlink shared channel scheduling module 531 is configured to determine the DL TX power available to a cell 201, 202, 203, 204, 205, 206, for physical channels associated with the downlink shared channel based on DL TX power allocated in the cell 201, 202, 203, 204, 205, 206, to physical channels associated with a pilot signal downlink channel. In some embodiments, the one or more downlink shared channel scheduling modules 531 are configured to determine the DL TX power based on an instantaneous or average value of the total DL TX power allocated to the cell 201, 202, 203, 204, 205, 206, for physical channels associated with downlink channels for a TTI. In some embodiments, the one or more downlink shared channel scheduling modules 531 are configured to determine the DL TX power based on a determined minimum ratio between the instantaneous or average value and the DL TX power allocated in the cell 201, 202, 203, 204, 205, 206, to physical channels associated with the pilot signal downlink channel. In some embodiments, the one or more downlink shared channel scheduling modules 531 are configured to determine the minimum ratio based on downlink transmission quality or type information.

In some embodiments, the one or more downlink shared channel scheduling modules 531 are configured to determine the DL TX power based on whether a downlink transmission in the TTI is an initial transmission or a re-transmission. In some embodiments, the one or more downlink shared channel scheduling modules 531 are configured to determine the DL TX power available to the cell 201, 202, 203, 204, 205, 206, for a downlink re-transmission in a TTI such that it is less than a determined DL TX power available to the cell 201, 202, 203, 204, 205, 206, for a downlink initial transmission in a TTI.

In some embodiments, the network node 110 may be configured, by using e.g. radio circuitry 550, to transmit downlink transmissions using the determined DL TX power available to a cell 201, 202, 203, 204, 205, 206, for physical channels associated with the downlink shared channel.

In some embodiments, the network node 110 may comprise a baseband module 530 and a downlink shared channel scheduling module 531. In some embodiments, the network node 110 may comprise a processing circuitry 510, which may also be referred to as processing module, processing unit or processor. The processing circuitry 510 may comprise one or more of the baseband module 530 and the downlink shared channel scheduling module 531, and/or perform the function thereof described below.

The embodiments for determining DL TX power for a downlink shared channel to be used in a TTI by cells 201, 202, 203, 204, 205, 206 served by the network node 110 in a wireless telecommunications network 100 may be implemented through one or more processors, such as, e.g. the processing circuitry 310 in the network node 110 depicted in FIG. 3, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 510 in the network node 110. The computer program code may e.g. be provided as pure program code in the network node 110 or on a server and downloaded to the network node 110. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

Thus, the network node 110 may further comprise a memory 520, which may be referred to or comprise one or more memory modules or units. The memory 520 may be arranged to be used to store executable instructions and data, such as, e.g. the determined minimum ratios $x_1$ and $x_2$, constants $\beta$ and $\lambda$, etc., to perform the methods described herein when being executed in the network node 110. Those skilled in the art will also appreciate that the processing circuitry 510 and the memory 520 described above may refer to a combination of analog and digital circuits, and/or one or more processors configured with software and/or firmware, e.g. stored in the memory 520, that when executed by the one or more processors such as the processing circuitry 510 perform the method as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, a computer program, comprising instructions which, when executed on at least one processor, e.g. the processing circuitry or module 510, cause the at least one processor to carry out the method for determining DL TX power for a downlink shared channel to be used in a TTI by cells 201, 202, 203, 204, 205, 206 served by the network node 110 in a wireless telecommunications network 100 as described above is hereby presented. Also, a carrier containing the computer program, wherein the carrier is one of an electronic signal, optical signal, radio signal, or computer readable storage medium, is hereby presented.

Furthermore, the network node 110 may also comprise one or more radio modules 551, 552, 553, wherein each radio module 551, 552, 553 comprises at least one power amplifier (not shown) and one or more antennas. The one or more antennas may be used by the radio modules 551, 552, 553 for transmitting downlink shared channel data to the served user equipments in the cells for which each of the radio modules 551, 552, 553 are providing radio coverage, such as, e.g. the cells 201-202, 203-204, 205-206, in sector 111, 112, 113 in FIG. 2, respectively.

The network node 110 may also comprise a radio circuitry 550, which may also be referred to as a radio, radio module, radio unit, or radio equipment. The radio circuitry 550 may comprise the radio modules 551, 552, 553.

Furthermore, it should be noted that the downlink shared channel scheduling module, i.e. the HS scheduler 531, that identify the opportunities for the dynamic power sharing between cells are implemented in the processing circuitry, e.g. processing circuitry 510, which means that there is no involvement of the radio modules, e.g. the radio modules 551-553, and that the decisions on whether or not to share power between cells may be taken by the downlink shared channel scheduling module in the processing circuitry in the network node 110 as frequently as for every scheduling opportunity, i.e. for each TTI.

It should also be noted that while the embodiments above are described in the context of WCDMA/HSPA technology, the embodiments may also be adapted and applicable to other Radio Access Technologies, RATs, such as, e.g. Long Term Evolution—LTE, in which several cells or cell carriers share one or more power amplifiers, PAs.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

ABBREVIATIONS

BLER BLock Error Rate
CN Core Network
CPICH Common Pilot CHannel
DCH Dedicated CHannel
DL Downlink
DPCH Dedicated Physical CHannel,
DPCCH Dedicated Physical Control CHannel
DPDCH Dedicated Physical Data CHannel
E-AGCH Enhanced Absolute Grant CHannel
E-HICH Enhanced DCH-HARQ Acknowledgement Indicator CHannel
EUL Enhance Uplink
F-DPCH Fractional-DPCH
HSPA High-Speed Packet Access,
HSDPA High-Speed Data Packet Access
HS-DSCH High-Speed Downlink Shared CHannel
HS-PDSCH High-Speed Physical Downlink Shared CHannel
HS-SCCH High-Speed Shared Control CHannel
IFHO Inter Frequency HandOver
IRAT Inter-Radio Access Technology
QoS Quality of Service
P-CPICH Primary Common Pilot CHannel
RAN Radio Access Network
RAT Radio Access Technology
S-CPICH Secondary Common Pilot CHannel
TBS Transport Block Size
TTI Transmission Time Interval
UE User Equipment
UL Uplink
WCDMA Wideband Code Division Multiple Access

The invention claimed is:

1. A method performed by a network node for determining a downlink transmission power for a downlink shared channel to be used in a Transmission Time Interval (TTI) by cells served by the network node in a wireless telecommunications network, wherein the network node includes a shared power amplifier that provides downlink transmission power to multiple cells served by the network node, the method comprising:

determining a total downlink transmission power available to a cell for all physical channels, wherein the total downlink transmission power available to the cell for all physical channels includes downlink transmission power allocated to the cell and downlink transmission power initially allocated to another cell that shares the shared power amplifier, but which is not currently being utilized by the other cell;

limiting a total downlink transmission power allocated in the cell for all physical channels based on the downlink transmission power allocated in the cell to physical channels associated with a pilot signal downlink channel, wherein a ratio of the total downlink transmission power allocated to the cell for all physical channels, to the downlink transmission power allocated in the cell to physical channels associated with the pilot signal downlink channel, is maintained below a threshold value;

calculating the downlink transmission power for the downlink shared channel as the difference between the limited total downlink transmission power allocated in the cell for all physical channels and downlink transmission power allocated to common channels and dedicated channels; and transmitting downlink transmissions on a physical channel associated with the downlink shared channel using the calculated downlink transmission power for the downlink shared channel.

2. The method according to claim 1, wherein the determining is further based on an instantaneous value of the total downlink transmission power allocated to the cell for all physical channels associated with downlink channels for a TTI.

3. The method according to claim 1, wherein the determining is further based on an average value of the total downlink transmission power allocated to the cell for all physical channels associated with downlink channels for more than one TTI.

4. The method according to claim 1, wherein the determining is further based on a determined minimum ratio between either an instantaneous value of the total downlink transmission power allocated to the cell for all physical channels associated with downlink channels for a TTI or an average value of the total downlink transmission power allocated to the cell for all physical channels associated with downlink channels for more than one TTI and the downlink transmission power allocated in the cell to physical channels associated with the pilot signal downlink channel.

5. The method according to claim 4, wherein the determined minimum ratio is determined using a downlink transmission quality or type information.

6. The method according to claim 1, wherein the determining is further based on whether a downlink transmission in the TTI is an initial transmission or a re-transmission.

7. The method according to claim 6, wherein the determined downlink transmission power available to the cell for a downlink retransmission in a TTI is less than the determined downlink transmission power available to the cell for a downlink initial transmission in a TTI.

8. The method according to claim 1, wherein the pilot signal downlink channel is the Common Pilot Channel (CPICH).

9. A network node for determining a downlink transmission power for a downlink shared channel to be used in a Transmission Time Interval (TTI) by cells served by the network node in a wireless telecommunications network, wherein the network node includes a shared power amplifier that provides downlink transmission power to multiple cells served by the network node, the network node further including processing circuitry and a memory that stores computer program instructions, wherein when the processing circuitry executes the computer program instructions, the network node is caused to:

determine a total downlink transmission power available to a cell for all physical channels, wherein the total downlink transmission power available to the cell for all physical channels includes downlink transmission power allocated to the cell and downlink transmission power initially allocated to another cell that shares the shared power amplifier, but which is not currently being utilized by the other cell;

limit a total downlink transmission power allocated in the cell for all physical channels based on the downlink transmission power allocated in the cell to physical channels associated with a pilot signal downlink channel, wherein a ratio of the total downlink transmission power allocated to the cell for all physical channels, to the downlink transmission power allocated in the cell to physical channels associated with the pilot signal downlink channel, is maintained below a threshold value;

calculate the downlink transmission power for the downlink shared channel as the difference between the limited total downlink transmission power allocated in the cell for all physical channels and downlink transmission power allocated to the sum of common channels and dedicated channels; and transmit downlink transmissions on a physical channel associated with the downlink shared channel using the calculated downlink transmission power for the downlink shared channel.

10. The network node according to claim 9, further configured to determine the downlink transmission power based on an instantaneous value of the total downlink transmission power allocated to the cell for all physical channels associated with downlink channels for a TTI.

11. The network node according to claim 9, further configured to determine the downlink transmission power based on an average value of the total downlink transmission power allocated to the cell for all physical channels associated with downlink channels for more than one TTI.

12. The network node according to claim 9, further configured to determine the downlink transmission power based on a determined minimum ratio between either an instantaneous value of the total downlink transmission power allocated to the cell for all physical channels associated with downlink channels for a TTI or an average value of the total downlink transmission power allocated to the cell for all physical channels associated with downlink channels for more than one TTI and the downlink transmission power allocated in the cell to physical channels associated with the pilot signal downlink channel.

13. The network node according to claim 9, further configured to determine the minimum ratio based on downlink transmission quality or type information.

14. The network node according to claim 9, further configured to determine the downlink transmission power based on whether a downlink transmission in the TTI is an initial transmission or a re-transmission.

15. The network node according to claim 9, further configured to determine the downlink transmission power available to the cell for a downlink re-transmission in a TTI such that it is less than a determined downlink transmission power available to the cell for a downlink initial transmission in a TTI.

\* \* \* \* \*